United States Patent
Röllin et al.

(10) Patent No.: US 6,592,174 B1
(45) Date of Patent: Jul. 15, 2003

(54) STRUCTURAL SUPPORT

(75) Inventors: Ulrich Röllin, Urdorf (CH); Samuel Streiff, Windisch (CH)

(73) Assignee: Alcan Technology & Management Ltd., Neuhausen am Rheinfall (CH)

( * ) Notice: Subject to any disclaimer, the term of this patent is extended or adjusted under 35 U.S.C. 154(b) by 0 days.

(21) Appl. No.: 09/890,905

(22) PCT Filed: Jan. 25, 2000

(86) PCT No.: PCT/EP00/00529

§ 371 (c)(1),
(2), (4) Date: Aug. 6, 2001

(87) PCT Pub. No.: WO00/46094

PCT Pub. Date: Aug. 10, 2000

(30) Foreign Application Priority Data

Feb. 5, 1999 (EP) .......................................... 998100994

(51) Int. Cl.⁷ ................................................. B60J 7/00
(52) U.S. Cl. ............................. 296/190.08; 296/100.16; 296/203.03
(58) Field of Search ....................... 296/190.08, 106.93, 296/100.16, 190.02, 203.02, 39.2; 220/592.25; 293/1; 428/122; 138/122; 264/171.14; 280/728.3; 248/345.1

(56) References Cited

U.S. PATENT DOCUMENTS

| | | | | |
|---|---|---|---|---|
| 2,356,624 A | | 8/1944 | Schulz et al. | |
| 3,388,944 A | * | 6/1968 | Crehore | 296/190.08 |
| 3,557,992 A | * | 1/1971 | Reeves | 220/592.25 |
| 3,715,138 A | * | 2/1973 | Finkle | 293/1 |
| 4,316,348 A | * | 2/1982 | Adell | 428/122 |
| 4,379,376 A | * | 4/1983 | Adell | 428/122 |
| 4,383,555 A | * | 5/1983 | Finley | 138/122 |
| 4,581,807 A | * | 4/1986 | Adell | 264/171.14 |
| 4,605,259 A | * | 8/1986 | Hurlburt | 296/190.08 |
| 4,627,655 A | * | 12/1986 | Collins | 296/106 |
| 4,688,846 A | * | 8/1987 | Martin, Jr. | 296/190.08 |
| 4,878,689 A | * | 11/1989 | Mitzkus et al. | 280/728.3 |
| 4,968,543 A | * | 11/1990 | Fujioka et al. | 296/83 |
| 5,118,162 A | * | 6/1992 | Saul | 248/345.1 |
| 5,190,803 A | | 3/1993 | Goldbach et al. | |
| 5,228,736 A | * | 7/1993 | Dutton | 296/100.16 |
| 5,232,220 A | * | 8/1993 | Poschenrieder | 473/535 |
| 5,243,747 A | * | 9/1993 | Mesnel et al. | 29/235 |
| 5,248,186 A | * | 9/1993 | Steinfeld et al. | 248/345.1 |
| 5,299,217 A | * | 3/1994 | Migita et al. | 257/103 |
| 5,344,603 A | * | 9/1994 | Jardin et al. | 264/252 |
| 5,498,099 A | * | 3/1996 | Scheuer | 403/231 |
| 5,507,522 A | | 4/1996 | Ritchie | |
| 5,876,003 A | * | 3/1999 | Waagenaar | 248/200 |
| 6,173,979 B1 | * | 1/2001 | Bernard | 280/163 |
| 6,276,748 B1 | * | 8/2001 | Gobessi et al. | 296/190.02 |
| 6,409,193 B2 | * | 6/2002 | Bernard | 280/163 |
| 6,419,305 B1 | * | 7/2002 | Larsen | 296/203.03 |
| 2001/0035661 A1 | * | 11/2001 | Doshi | 296/39.2 |

FOREIGN PATENT DOCUMENTS

| | | |
|---|---|---|
| EP | 317 109 | 5/1989 |
| EP | 733 537 | 9/1996 |

* cited by examiner

*Primary Examiner*—Kiran Patel
(74) *Attorney, Agent, or Firm*—Ostrolenk, Faber, Gerb & Soffen, LLP

(57) ABSTRACT

A structural support for frame and grid constructions of vehicle cabs and transport elements includes at least two profile parts, e.g., an outer profile part and an inner profile part, the profile parts being connectable together such as with an adhesive. Preferably the outer profile part is made of a metal such as aluminum, and the inner profile part is made of a plastic and particularly a fiber-reinforced plastic.

24 Claims, 4 Drawing Sheets

STRUCTURAL SUPPORT

PRIORITY CLAIM

This is a U.S. national stage of application No. PCT/EP00/00529, filed on Jan. 25, 2000. Priority is claimed on that application and on the following application:

Country: Europe, Application No. 998 10099.4, Filed: Feb. 5, 1999.

BACKGROUND OF THE INVENTION

The present invention concerns a structural support for cabs, in particular for drivers' cabs of road or rail vehicles, hovercraft or cable cars, or vehicle body constructions for road or rail vehicles, where the structural support in cross-section consists of a first profile part of fibre-reinforced plastic and a second profile part of metal, and the plastic profile part is a longitudinal profile with in sections different cross-sectional structures, and the connection between the two profile parts is an adhesive connection or a plastic weld connection, and a process for their production, and a frame or grid construction with a structural support. Structural supports are profiles forming a frame or grid construction.

Frame or grid constructions for cabs, in particular drivers' cabs of road and/or rail vehicles, for body constructions of road or rail vehicles or other transport elements such as hovercraft or cable cars etc., are today mainly made from the material iron, steel, aluminium and plastic. Normally, the profiles of such frame or grid constructions are made either from aluminium or plastic. The individual profiles are joined together by mechanical fixing means or by gluing.

Trims e.g. panels and other functional elements e.g. plastic panels, laminate panels or glass, and supports i.e. load-bearing elements such as consoles or connecting elements for profiles, and attachments for example locks, hinges, running boards etc., are fitted to the frame constructions.

Profiles for frame constructions are today mostly made as complete parts from one piece or at least from the same material, mainly aluminium. Framework constructions are also known in which an insulating material is inserted between two metal profile parts.

On one profile side in each case, normally the inside, different cross-sectional structures are often required which are for example designed to hold supports, wall elements, trim parts or attachments.

The terms "inside" or "on the inside" or "internal" refer to the side facing the interior of the cab or transport element, while "outside" or "on the outside" or "external" means the side facing away from the interior of the cab or transport element.

Furthermore, it is often necessary to reinforce locally the profile cross-section in certain areas under more than average load against thrust and tension forces.

U.S. Pat. No. 5,507,522 describes a hybrid support as a side longitudinal member of a guide frame for a vehicle chassis. The hybrid support consists of at least three part profiles, namely a corrugated structured plastic profile which can in turn be made of two mirror-symmetrical part profiles, and two strip-like U-profiles of metal which lie against the plastic profile on two opposite sides and surround this. The individual profile parts are connected together by means of adhesive connections.

U.S. Pat. No. 5,190,803 describes a structural part made of a shell-like first part of metal and a rib structure of plastic inlaid into the shell-like part to reinforce the structure.

U.S. Pat. No. 2,356,624 describes a self-supporting vehicle body. The body contains a metal frame on the outside of which are joined pressings made of synthetic resin.

EP 0 317 109 describes a profile structure which consists of a first structure of metal and a second external structure of plastic, where the second structure of plastic has a finish structure with low tolerances which is placed over part of the surface of the first structure and is glued to this.

EP 0 733 537 describes a door frame with a trim part made of plastic on the outside which is glued to the frame structure of the door frame.

SUMMARY OF THE INVENTION

The object of the present invention is to provide structural supports for a frame construction which are light, can be reinforced locally individually, allow the simple attachment of supports for profile connections, trim elements and attachments such as hinges or locks and which have optimum controlled crushing and crash behaviour and high strength, and provide good insulation. The structural support should also be extremely stable and resistant to breaking and bending in relation to the longitudinal and transverse forces applied and in relation to shear forces.

According to the invention, this is achieved in that the different cross-sectional structures are designed for special functional tasks such as holding equipment carriers, wall, roof or window elements, or for holding supports for connections with other profiles or attachments, and the co-efficient of thermal expansion of the first profile part is adapted to the co-efficient of thermal expansion of the second profile part by the quantity and/or substance composition of a mixed-in filler and/or the quantity and/or substance composition of the fibre reinforcement materials, where the co-efficient of thermal expansion of the first profile part deviates from the co-efficient of thermal expansion of the second profile part by less than 10%.

Preferably the profile cross-section of the structure carrier consists of two profile parts, where the one profile part consists preferably completely of metal and the other profile part preferably completely of plastic.

A frame or grid construction can consist completely or partially of the structural supports according to the invention.

The profile part of metal (metal profile part) advantageously consists of a ferrous or non-ferrous metal such as iron, galvanised iron, steel, brass, aluminium and its alloys or magnesium and its alloys. The metal profile part is preferably an extruded profile of metal in particular aluminium or its alloys. The metal profile part can be deformed as desired in its longitudinal direction and modified in its cross-sectional structure, where the cross-sectional structure of the profile part can be modified locally, in sections or throughout by bending, deforming, cutting, notching out or in any other manner. The wall thickness of the metal profile parts, in particular of aluminium, is suitably 1.5 to 7 mm, preferably 2 to 5, ideally around 3 mm.

The profile part of plastic (plastic profile part) is suitably made of reinforced and preferably fibre-reinforced plastics. Reinforcement fibres can in particular be inorganic fibres such as glass fibres, carbon or graphite fibres, metal fibres, ceramic fibres or fibres of cellulose derivatives or polyvinyl chlorides, polyacrylonitriles, polyolefins, polyesters, polyamides or aramide fibres etc. or natural fibres such as fibrous silicate minerals, jute, sisal, hemp, cotton etc. The plastics can also be plastics reinforced with textiles, fabrics, mats or fleeces of said materials. Reinforcement materials can also be coatings, rods, plates or foils of suitable materials, for example of the above materials, inlaid in the plastic. Advantageously, glass fibres, carbon fibres or aramide fibres are used and ideally the fibres are processed in the form of rovings, fabrics, mats or multi-axial matting in the pressed process, where the fibres are suitably oriented in the profile longitudinal direction.

The fibre content of the plastic part is for example 40 to 60 vol %.

As in particular with the use of fibre fabrics etc. the fibres of the reinforced plastic part profiles are oriented targeted in one or more directions and in particular in the profile longitudinal direction, the plastic profile part has a lower load-bearing capacity or strength against shear forces and also transverse forces. These disadvantages are eliminated by supplementing the plastic profile part with the metal profile part.

The plastic can also, for example, as well as reinforcement fibres contain fillers which, for example, can be coarse or fine-grained, plate-like etc. Fillers such as for example calcium carbonate, kaolin, glass, mica, talc, silicates, Wollastonite or aluminium oxides reduce the co-efficient of thermal expansion (heat expansion co-efficient) of the plastic. Fillers such as aluminium oxides and antimony oxide can be used in order to increase the fire resistance of the plastic, and fillers such mica and silicates can be used to increase the chemical resistance of the plastic. Electrically conductive fillers such as metal powder and graphite or soot is used to avoid a static charge of the plastic. Fillers, for example lime, carbon particles or titanium dioxide can be used as pigments.

The plastic or matrix-forming plastic for reinforced plastics can be a duroplastic known as duroplast below or a thermoplastic referred to below as a "thermoplast".

Duroplasts can for example be epoxy resins, phenol-formaldehyde resins, urea-formaldehyde resins, melamine-formaldehyde resins or melamine-phenol-formaldehyde resins, unsaturated polyester resins, polyamides or polyurethane. Ideally the duroplasts consist of epoxy resins.

Suitable thermoplasts are for example polyolefins such as polyethylene and polypropylene, polyester, polyvinyl chloride (PVC), polyamide, polycarbonate (PC) and acrylonitrile-butadiene-styrene copolymer (ABS) or poly-blends of ABS and PVC, ABS and PC or ABS and polyurethane, also styrene-acrylonitrile copolymers (SAN). Ideally the thermoplasts consist of polyethylenes or polyamides.

The plastic profile part is for example deep-drawn, extruded, laminated, pressed, cast, indexed or thermoformed etc. For production of the plastic profile part a process is selected which has practically no tolerances in the profile to be produced. This means the dimensions and geometry of the profile part correspond precisely to the desired ideal form. The wall thicknesses of the plastic profile parts are suitably 1.5 to 10 mm, preferably 2 to 7 mm, ideally 4 to 5 mm.

In production of such plastic profile parts it is also possible to provide inserts such as for example supports or attachments of metal or other materials. In other words supports or attachments can be inlaid in the production mould and in this way integrated into the structure body.

The plastic profile part can also be produced as a lengthwise profile for example with different cross-sectional structures and in a subsequent profile formed as desired in its longitudinal direction. In this way, for example, profile frames can be produced to hold door elements or general profile frames for cabs and transport elements.

The plastic profile part can also be a structural or integral foam, where preferably the density is greatest at one or both edge areas, and in particular at the surfaces. The surface is preferably compacted into a hard solid shell where the density diminishes evenly or in steps, in particular towards the core layer, and a cell-like porous core is formed.

The metal and plastic profile parts of the structural supports preferably have as similar as possible a co-efficient of thermal expansion. The co-efficient of thermal expansion of the plastic profile part for example deviates by less than 10%, preferably by less than 5% and ideally by less than 2% from the co-efficient of thermal expansion of the metal profile part.

The co-efficient of thermal expansion of the plastic profile part can for example be determined by the quantity and/or composition of the filler. In reinforced or fibre-reinforced plastics, the co-efficient of thermal expansion can also all be determined by the quantity and/or composition of the reinforcement material or fibre material. This allows the production of plastic profile parts which have approximately the same co-efficient of thermal expansion as the metal profile parts to be connected with these.

Both the plastic and the metal profile part can be used as external and/or internal profile parts.

If the external profile parts must fulfil special requirements in regard to surface treatment and surface quality, such is the case for example in the automotive industry, the metal profile parts ideally lie on the outside.

Preferably in this case aluminium profile parts are used which for example can be polished to a particularly good gloss and reflection and which have a permanent surface quality.

For other applications the plastic profile part can lie on the outside. This embodiment is suitable for example for preventing or reducing the reflection of radar pulses on contact with the structural support. The plastic profile part in this case preferably has a coarse or perforated structure.

Two profile parts are joined for example by gluing or by thermoplastic bonding. The thermoplastic bonding can take place either by thermoplastic adhesion or by thermoplastic welding.

When a melt adhesive is used, e.g. before the joining process, both profile parts are heated until the melt adhesive is activated. The joining process here refers to the joining and permanent separation-resistant connection of the two profile parts.

When connecting two profile parts e.g. these can be brought to an adhesive activation temperature of for example approximately 80° C. to 150° C., whereby these two profile parts are connected together.

When thermoplastic connection techniques are used e.g. the metal profile part is heated before the joining process, e.g. to a temperature of 200° to 240° C., in particular around 220° C. Thermoplastics are brought to melting during the jointing process by the heated metal profile at the contact point and the two parts permanently and separation-resistant connected after subsequent cooling. The plastic profile part is preferably itself a thermoplast which in the jointing process is brought partially or completely to melting at the connection points so that the plastic profile part itself is activated locally as a melt adhesive.

Normally, outside the local heating zone of the thermoplast the temperature diminishes very quickly so that the plastic profile part as a whole is not affected by the local heating.

Suitable adhesives are for example phenol resins, epoxy resins, polyurethane or cyanacrylates. For adhesive joints adhesive tapes or double-sided adhesive tapes can be used.

The adhesive joints or thermoplastic joints can also be locally or fully supported or reinforced by additional mechanical fixing means such as rivets or screws or clip connections.

The adhesive joints and where applicable an intermediate strip also applied to the contact points also absorb stress forces which can occur in the profile parts as a result of different co-efficients of thermal expansion of the profile parts or as a result of existing tolerances. The intermediate strip can be a textile strip, a foam strip or a plastic strip, in particular it can be an expansion strip i.e. an expandable intermediate strip. If adhesive tapes, for example double-sided tapes, are used to connect the profile parts, these can also serve as intermediate strips with the said function.

The two profiles can be prepainted or primed before the joining process, where the profile parts in this case are heated preferably not above 80° C. to 150° C. for the joining process.

After joining, the complete structural support can for example by finish painted.

The two profile parts preferably have no undercut adhesive surface so that same are devoid of undercutting in the joining process. This means that the two profile parts in the joining process can be pressed together with a linear movement and joined.

If the adhesive requires, by exertion of an additional pressure for example by contact pressure or rolling, this jointing technique allows the production of a rapid and force-transmitting connection.

In some cases adhesive surfaces can be provided on undercut profile surfaces where in the jointing process with the profile parts for example twist or guidance movements must be performed.

The metal profile part in contrast to the plastic profile part can under certain circumstances have greater tolerances which must be compensated before the jointing process so that no excess stress occurs in the structural support.

The metal profile is therefore if necessary clamped before the jointing process in a device or jig where under plastic deformation it is brought into the ideal form. Preferably, the metal profile part is first heated.

To compensate for tolerances of the metal profile an expandable intermediate strip, a so-called expansion strip or double-sided adhesive tape can be applied to one or both profile parts. The same purpose is served by pretreatment of one of the two profile parts with an adhesive plastic.

Structural supports fulfil various tasks and have for example to hold wall, roof and window elements, equipment carriers and supports for connections with other profiles and attachments such as locks or hinges, where these parts must be fixed to the structural support in a stable manner. The cross-sectional structures of such profiles must therefore be formed according to their future functions.

Normally only one side of the structural support, usually the internal profile parts, has a multi-function load. This must have correspondingly adapted cross-sectional profiles such as for example balcony-like structures to hold equipment carriers etc. The external profile part normally fulfils fewer functional tasks and therefore contains fewer or no cross-sectional changes.

A structural support according to the invention preferably contains a profile part extending over the entire structural support with preferably uniform profile cross-section, preferably the external profile part of metal. This profile part can however where applicable have local or sectioned different cross-sectional structures and for example local or through shapings. The other, for example internal profile part of plastic, preferably has different cross-sectional structures tailored to special functions. This profile part can consist of several linear profile parts with different profile cross-sections or geometries the complete profile part being for example produced by selection of a specific manufacturing process as a complete part with different cross-sectional structures.

It is also possible to provide an external load-bearing profile part, for example of aluminium, and fit onto the external profile part only individual interior profile parts in sections, for example of reinforced plastic, for local reinforcement or application of attachments or to hold components such as walls, roofs, windows.

Between two adjacent profile sections in the area of a local cross-sectional change, a support or attachment, for example a stop, i.e. a part of metal or plastic recessed or projecting in relation to the profile, can be fitted as a connection.

Attachments can be fitted either before or after the profile parts are joined. As a fixing means, preferably an adhesive connection or a thermoplastic connection is selected.

Attachments can where applicable also be attached to the profile or profile part by way of known mechanical fixing means such as screws or rivets.

The open profile parts, i.e. the inner and/or outer profile parts, can before joining, for example, have a foam layer applied over the entire length or over certain longitudinal sections of the structural support, for example to reinforce the structural support or for insulation purposes. The foaming of hollow elements on the profile or profile part is also possible.

The two profile parts can in the joined stage surround a linear element following the longitudinal form of the profile parts, for example a girder, profile, beam, preferably containing composite materials, enclosing this preferably at least partly by a tight fit. The profile parts can also be connected separation-resistant with the surrounded linear element by an adhesive joint, thermoplastic joint or by mechanical connections such as rivets, screws, clamps etc.

For the purpose of increasing the strength, improving the crash behaviour of frame constructions or for the purpose of heat or sound insulation, for example a foam part can be provided as a stop component.

The two profile parts can also be formed as solid or hollow profiles. Where hollow profile parts are used, multi-chamber hollow profiles can be created by the joining process. The two profile parts or one of the two can, for reinforcement and stiffening of the frame construction, be formed over the entire length of the structural support or in sections as hollow elements. Complete hollow elements can also assume additional functions and for example serve as cable ways.

The two profile parts can have locally closed hollow elements which firstly can lead to a local higher strength and secondly serve as a fluid tank for example as a screen wash liquid tank for vehicles.

To improve the surface quality or structure of an individual design, on the visible sides of the profile parts or the structural support, additional metal or plastic parts can be fitted by means of clip or snap connections, glue or other fixing means such as rivets, screws or a combination thereof.

The use and application of the structural supports according to the invention are multiple. The structural supports are used preferably for vehicle drivers' cabs and cabs in general which are used for mass transport, as high requirements for controlled crash and crushing behaviour are imposed on such cabs to protect the passengers, and the avoidance of cold bridges in the frame profile in relation to insulation is very important. A structural support can be formed as a structural frame or frame profile i.e. a structural support as a complete part simultaneously forms the frame profile. For example, the structural support can be formed as the frame of a vehicle cab to hold a vehicle door.

As the internal profile part is made of plastic, in the cab attachments, trim elements etc. can be glued to the structural support interior easily and without great expense. In contrast to metal surfaces no complex surface treatments are required for adhesive connections to plastic parts.

The structural support according to the invention has the great advantage that, due to the material composition described, both the positive properties of metal and the advantageous properties of plastic, in particular reinforced plastic, can be utilised.

The structural support according to the invention also has no cold bridges and has excellent insulation properties as one profile part consists completely of insulating plastic. At the same time the formation of condensation water on the inside of the cab or transport body is prevented or at least reduced.

The structural support according to the invention, with an overall lighter weight, is characterised by better strength. The plastic profile part ensures greater rigidity of the structural support whereas the metal profile part gives the structural supports optimum crushing or crash behaviour. An integral expanded foam section can massively improve the possible stability problems (buckling etc.) of the structural support.

Furthermore, the fibres of the plastic parts can be aligned in the profile longitudinal direction in order to absorb optimally the main forces (tension and compression forces) acting on the profile without, however, rendering the structural support susceptible to shear and transverse forces.

If the plastic profile part of the structural support consists of a thermoplast, the profile part can itself be activated as a melt adhesive whereby the application of adhesive mastic or adhesive tape is superfluous.

A structural support according to the invention also allows the cross-sectional profile to be easily modified locally or in sections in order for example to reinforce the structural support locally or adapt it locally as a carrier for attachments or to hold wall, roof and window elements.

BRIEF DESCRIPTION OF THE DRAWINGS

The invention is described in more detail below as an example with reference to the enclosed drawings. In the drawings

FIG. 1c: is a side view of a longitudinally deformed profile part according to FIG. 1a;

DESCRIPTION OF THE PRESENTLY PREFERRED EMBODIMENTS

Figure 1A:
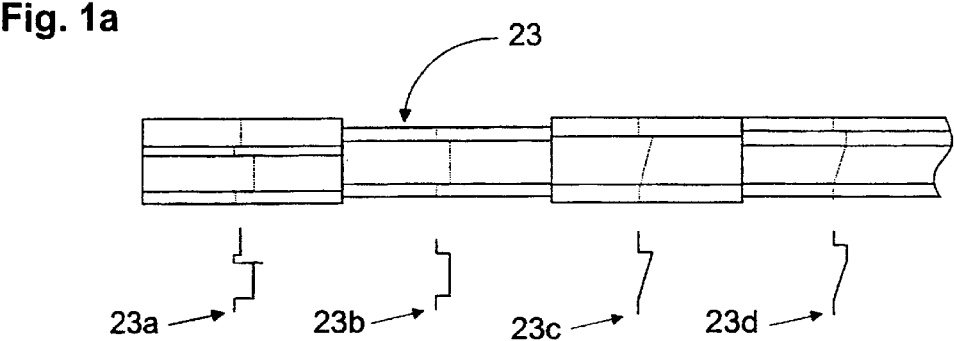
FIG. 1a: is a side view of a profile part of plastic.

FIG. 1a shows a profile part 23 of reinforced plastic with different profile cross-sections 23a, 23b, 23c, 23d. The profile part 23 in FIG. 1c is formed into a part profile frame for a cab to hold a side door. The cross-sectional structures are adapted according to the local requirements on the plastic profile, for example to hold stop parts or other elements or to reinforce the profile.

Figure 1B:
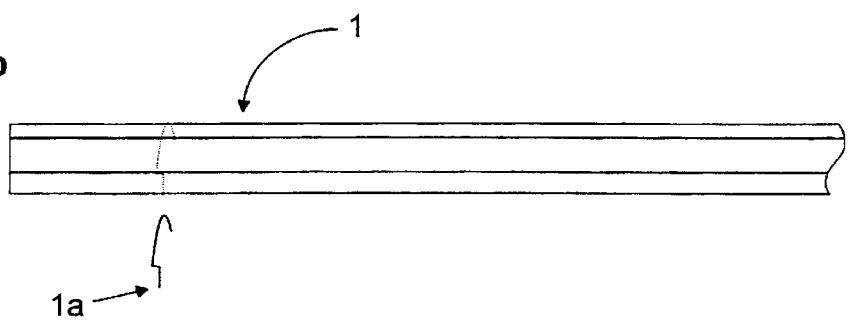
FIG. 1b: is a side view of a profile part of metal.
Figure 1C:
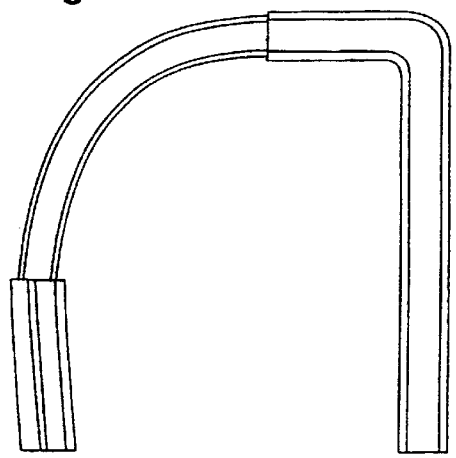

FIG. 1b shows the profile part 1 of aluminium, for example an extruded profile part with a uniform profile cross-section 1a. The profile part 1 is moulded in FIG. 1d into an aluminium part frame 1 supplementing the part profile frame 23 of plastic.

Figure 1D:
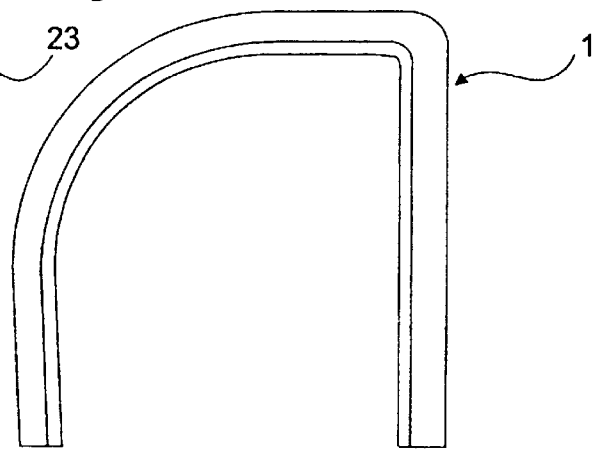
FIG. 1d: is a side view of a longitudinally deformed profile part according to FIG. 1b.
Figure 1E:
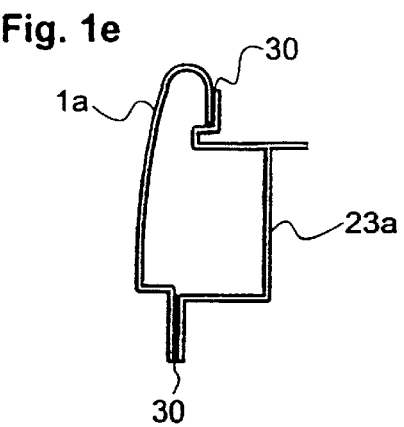
FIG. 1e: is cross-section of a joined profile according to FIGS. 1c and 1d.

The two part frames or part profile frames 1, 23 according to FIGS. 1c and 1d are in a further step joined into a complete profile frame for example by means of adhesive connection 30 where the aluminium profile part lies on the outside. The two part profiles 1, 23 can be connected together as a tight fit by way of the connecting surfaces provided. FIG. 1e shows a cross-section through a joined profile frame according to FIGS. 1c and 1d with part profile cross-sections 1a and 23a.

The width of the part profile frames 1, 23 according to FIGS. 1c, 1d, or the profile frame for example, amounts to 1.50 m to 3.50 m, preferably 2.00 m, and the height measures for example 1.50 m to 2.50 m, and preferably 2.00 m.

The curved section of the part profile frames 1, 23 according to FIGS. 1c, 1d can at its lower end be angled in the direction of the opposite straight section of the profile part frame 1, 23 for example by less than 10°, preferably less than 5° from the vertical.

Figure 2:
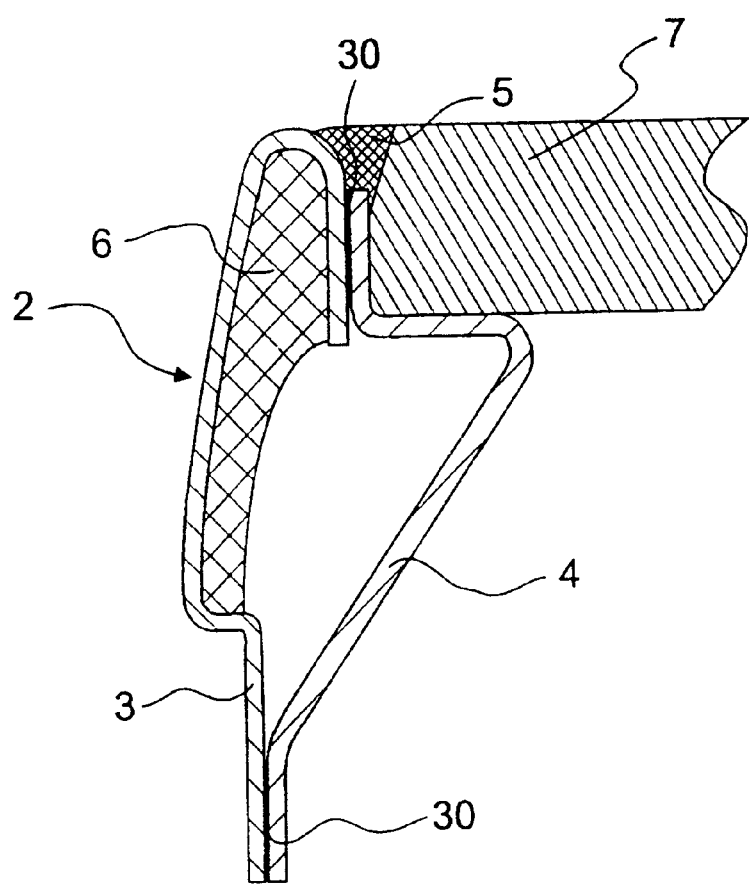
FIG. 2 is a cross-section of a design variant of the profile according to the invention with a roof element.

FIG. 2 shows a structural support 2 according to the invention to hold a roof element 7 with an internal or inner profile part 4 of fibre-reinforced plastic and an external or outer profile part 3 of aluminium. The inner profile part 4 and the outer profile part 3 are connected together by means of adhesive connections 30.

A roof element 7 lies in a tight fit on the structural support 2, where the profile part 4 to hold this forms a type of balcony, and is connected with this by means of adhesive joint 5. A foam layer 6 is inlaid into the profile part 3 for better sound and heat insulation.

In comparison with FIG. 2 the structural support can also be used to hold a window element or wall element such as a rear wall. The window element or wall element in this example is joined to the structural support forming a balcony by way of an adhesive or sealing joint.

Figure 3:
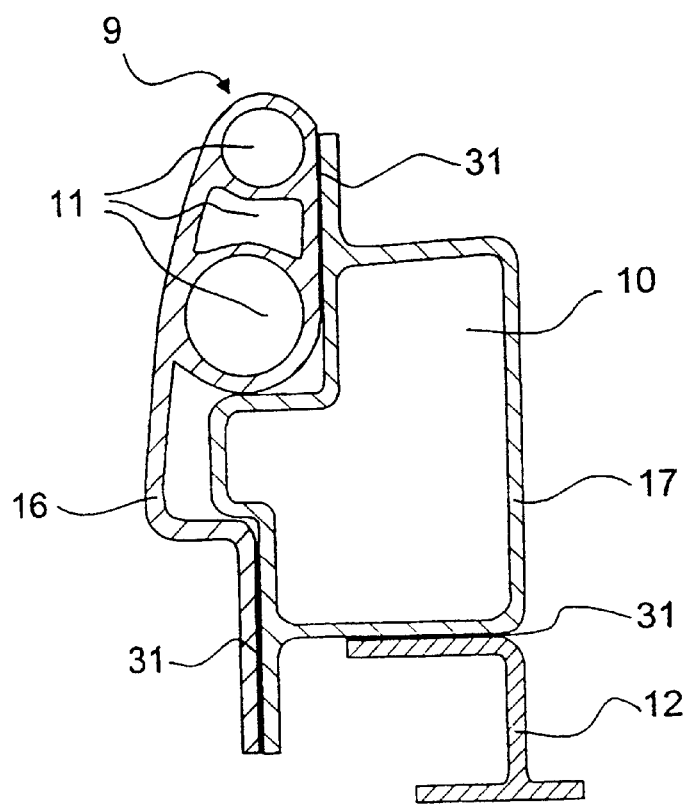
FIG. 3 is a cross-section of a design variant of the profile according to the invention with a stop part.

FIG. 3 shows a structural support 9 according to the invention in which the outer profile part 16 consists of aluminium and has through hollow cavities 11 which for example can serve as cable ducts. The inner profile part 17 of fibre-reinforced plastic has a closed cavity 10 which for example can be used as a fluid tank. On the inner profile part 17 is also fitted a stop component 12, for example of metal or plastic by means of thermoplastic connection 31. The inner profile part 17 and the outer profile part 16 are connected together by means of thermoplastic connection 31.

Figure 4:
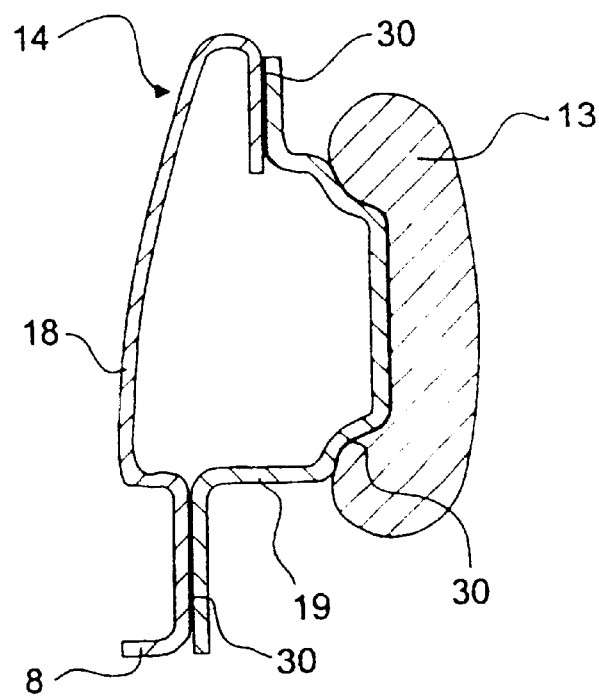
FIG. 4: is a cross-section of a design variant of the profile according to the invention with an attachment.

FIG. 4 shows a structural support 14 according to the invention with an external profile part 18 of aluminium and an internal profile part 19 of fibre-reinforced plastic on which is fitted an attachment 13 of foam by means of adhesive connection 30. The outer profile part 18 also has a shaping 8 which has performed subsequently on the profile part 18 and can be complete or local, for example to hold attachments. The inner profile part 19 and the outer profile part 18 are connected together by means of adhesive connections 30.

Figure 5:
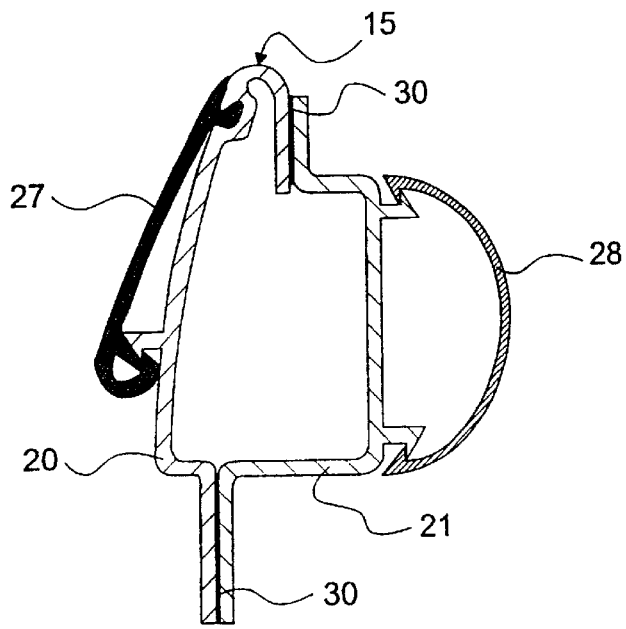
FIG. 5: is a cross-section of a design variant of the profile according to the invention with clip elements.

FIG. 5 shows a structural support 15 according to the invention which contains on both the outer profile part 20 and on the inner profile part 21 clip and/or snap elements 27, 28 which are connected by way of corresponding clip and/or snap connections to the profile parts 20, 21. Such elements serve firstly to modify the design of a cab or transport element and secondly they are used instead of expensive surface treatment of the profile exterior or interior. The inner profile part 21 of fibre-reinforced plastic and the outer profile part 20 of aluminium are connected together by means of adhesive connections 30.

Figure 6A:
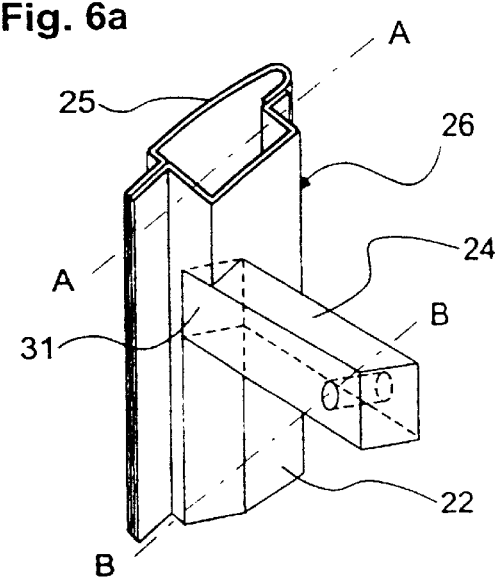
FIGS. 6a–c: are views of a structural support according to the invention with changing cross-sectional structure.

FIG. 6a shows a section of a structural support 26 according to the invention with an outer profile part 25 of aluminum and an inner profile part 22 of fibre-reinforced plastic, where the inner profile part 22 has a cross-sectional change. In the area of the local cross-sectional change from a rectangular to an oblique cross-section, a supporting element 24 is connectively fitted. The profile part 22 of fibre-reinforced plastic can be made of one piece, where the production mould in this case contains corresponding cross-sectional changes or the profile part 22 can be composed of two individual linear profile parts of different cross-sections.

The inner profile part 22 and the outer profile part 25 are connected together by means of adhesive connections 30.

Figure 6B:
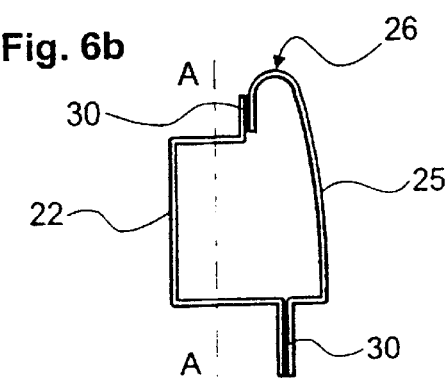
Figure 6C:
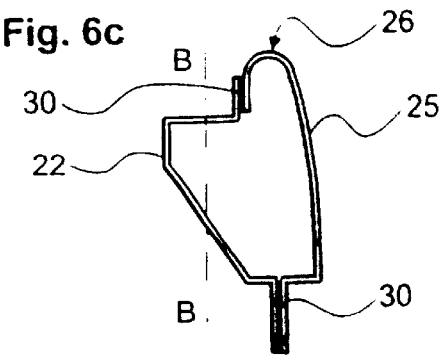

FIG. 6b shows a cross-section through FIG. 6a along line A—A above the support 24 with rectangular cross-section of the profile part 22, and FIG. 6c shows a cross-section through FIG. 6a along line B—B below the support 24 with oblique cross-section of the profile part 22.

Where a contour transition exits between one cross-sectional geometry and that of an adjoining different cross-sectional geometry, it is desirable that such transition be devoid of transition obtrusive structure.

What is claimed is:

1. A structural support for frame and grid constructions of vehicle cabs and transport elements, consisting of:
   a first profile part of a fibre-reinforced plastic; and
   a second profile part of a metal, said profile parts being connected together, said plastic first profile part having a longitudinal profile with different cross-sectional structures designed for particular functional tasks, the first profile part having a co-efficient of thermal expansion, said first profile part including at least one of the group consisting of a quantity of a mixed-in filler, a substance composition of said filler, a quantity of a fiber reinforcement material, and a substance composition of said fiber reinforcement material so that said co-efficient of thermal expansion of said first profile part is adapted to and deviates from a co-efficient of thermal expansion of said second part by less than 10%.

2. A structural support according to claim 1, wherein the deviation of the co-efficient of thermal expansion of said first profile part is about 5% less than said co-efficient of thermal expansion of said second profile part.

3. A structural support according to claim 1, wherein the deviation of the co-efficient of thermal expansion of said first profile part is about 2% less than said co-efficient of thermal expansion of said second profile part.

4. A structural support according to claim 1, wherein said first profile part comprises a matrix-forming plastic of one of a duroplast, and a thermoplast, said second profile part comprising one of aluminum and an aluminum alloy.

5. A structural support according to claim 4, wherein the duroplast is an epoxy resin, and the thermoplast is one of a polyethylene and a polyamide.

6. A structural support according to claim 4, wherein the second profile part is an extruded part.

7. A structural support according to claim 1, wherein the fibre is one of a glass fibre, a carbon fibre and an aramide fibre.

8. A structural support according to claim 1, wherein said first profile part has a wall thickness in a range of about 1.5 mm to about 10 mm, and said second profile part is aluminum and has a wall thickness in a range of about 1.5 mm to about 7 mm.

9. A structural support according to claim 8, wherein the plastic profile wall thickness is about 2 mm to about 7 mm.

10. A structural support according to claim 9, wherein the plastic profile wall thickness is about 4 mm to about 5 mm.

11. A structural support according to claim 8, wherein the metal profile part wall thickness is about 2 mm to about 5 mm.

12. A structural support according to claim 11, wherein the metal profile part wall thickness is about 3 mm.

13. A structural support according to claim 1, wherein the connection between said first and second profile parts is an adhesive connection.

14. A structural support according to claim 13, wherein the adhesive is one of a glue, a melt adhesive, and adhesive tape.

15. A structural support according to claim 1, wherein the connection between said first and second profile parts is a thermoplastic connection.

16. A structural support according to claim 15, wherein said thermoplastic connection is one of a melt connection and a weld connection.

17. A structural support according to claim 1, wherein said first profile part is of a thermoplast, and has connecting surfaces for connection to said second profile part, said thermoplast of said connecting surfaces constituting a thermoplastic adhesive.

18. A structural support according to claim 17, wherein the connecting surfaces are devoid of undercutting.

19. A structural support according to claim 1, wherein inserts of supports and attachments are embodied in said first profile part as inlaid elements.

20. A structural support according to claim 1, wherein the longitudinal profile of the plastic first profile part has sections with different cross-sectional structures.

21. A structural support according to claim 20, wherein said first profile part has an attachment at a location where one cross-sectional structure adjoins another cross-sectional structure.

22. A structural support according to claim 20, wherein the first profile part has a contoured transition between one and an adjoining cross-sectional geometry, which transition is devoid of transition obtrusive structure.

23. A structural support according to claim 1, wherein the first profile part and the second profile part are connected together by an adhesive connection.

24. A structural support according to claim 1, wherein the first profile part and the second profile part are connected together by a plastic weld connection.

* * * * *